March 25, 1930.   T. ROBINSON   1,751,949
COATING APPARATUS
Filed Dec. 16, 1926   2 Sheets-Sheet 1
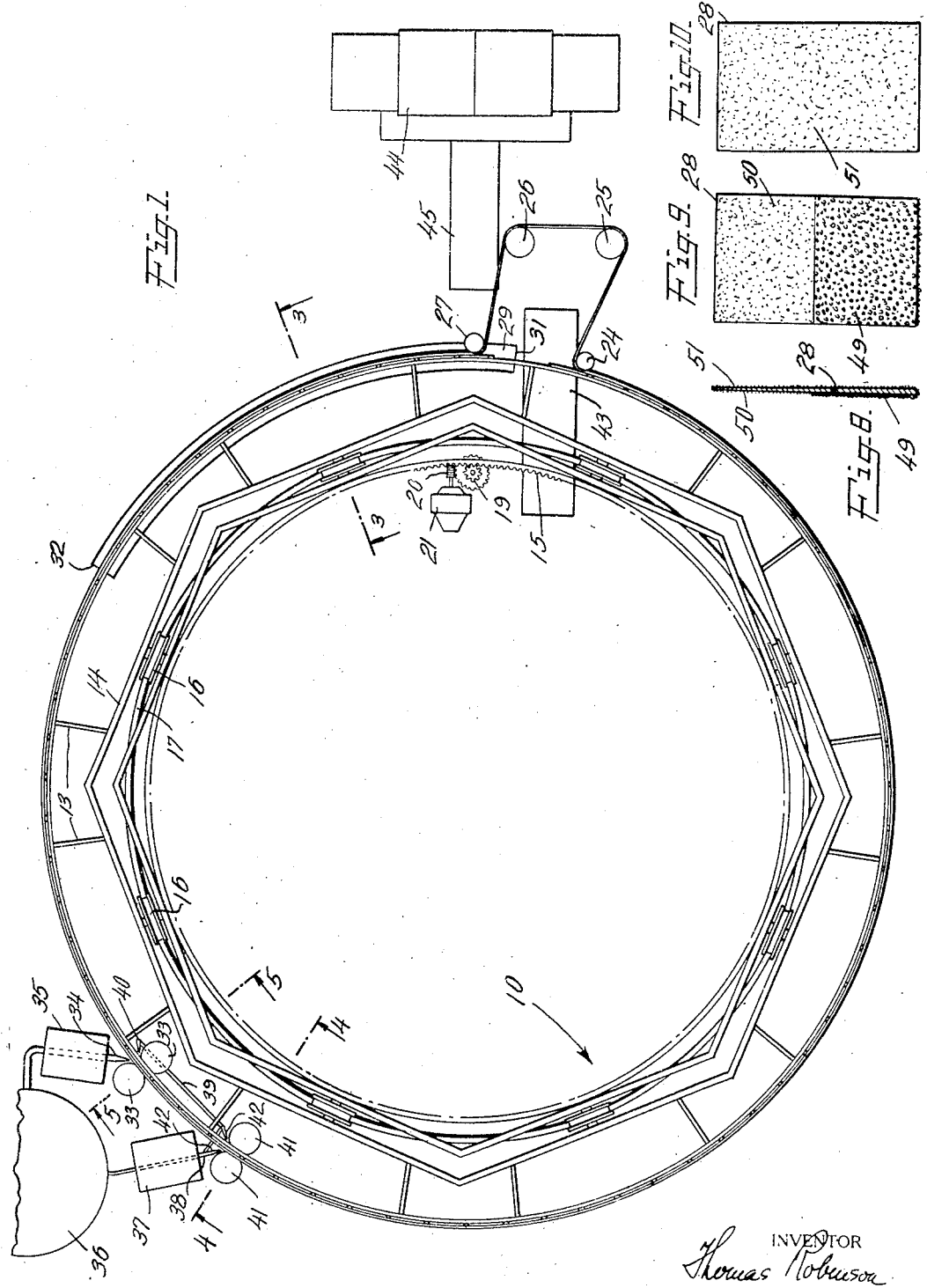

March 25, 1930.  T. ROBINSON  1,751,949
COATING APPARATUS
Filed Dec. 16, 1926   2 Sheets-Sheet 2
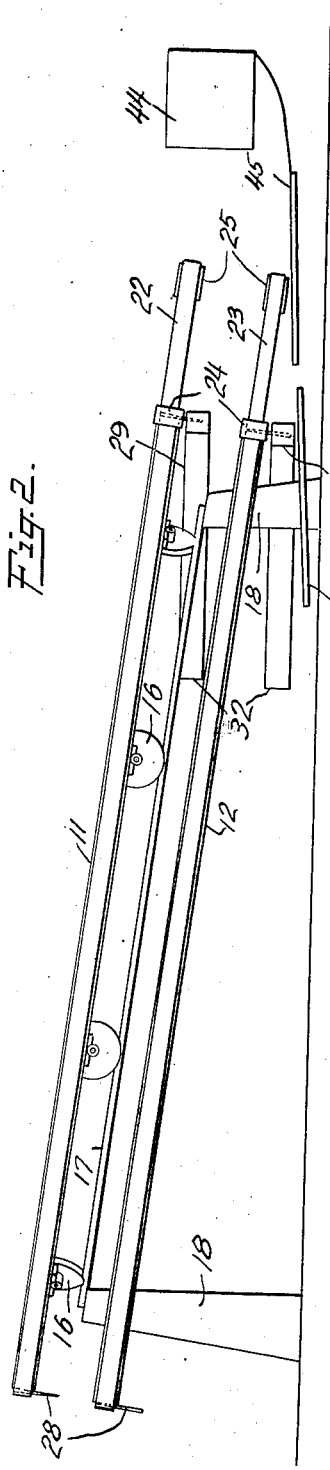
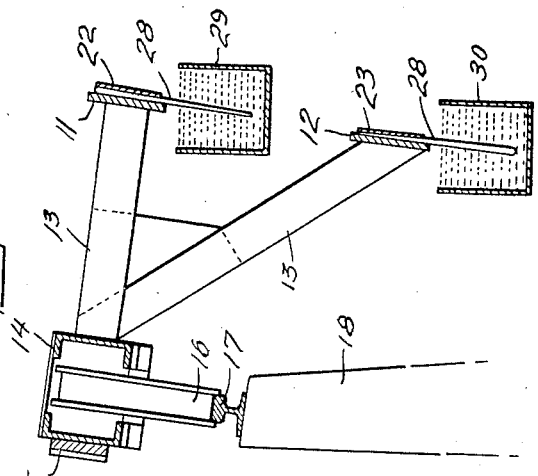
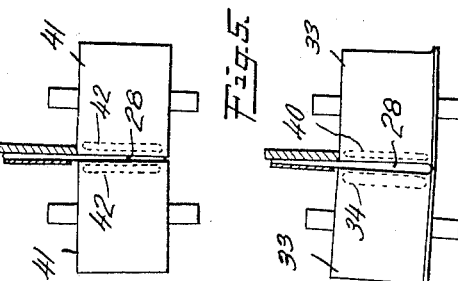
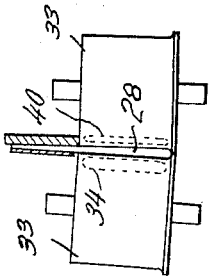
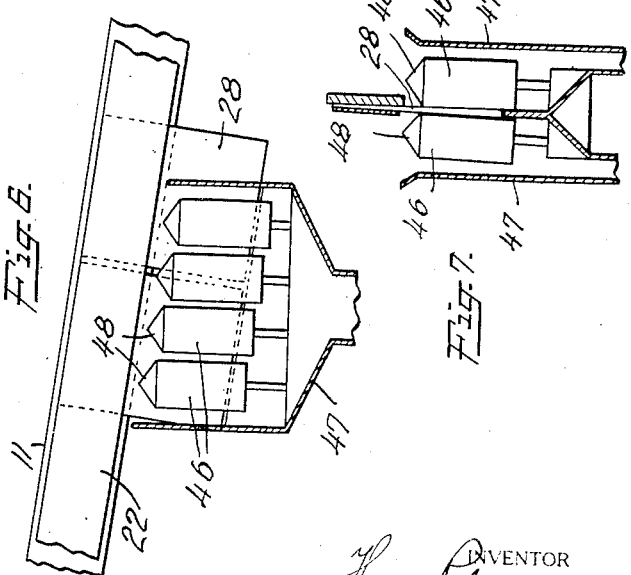

Patented Mar. 25, 1930

1,751,949

UNITED STATES PATENT OFFICE

THOMAS ROBINSON, OF NEW YORK, N. Y., ASSIGNOR TO LANCASTER ASPHALT, INC.

COATING APPARATUS

Application filed December 16, 1926. Serial No. 155,245.

This invention relates to the art of applying coatings to objects, and is concerned more particularly with apparatus which may be used with great facility for applying a protective coating to a succession of articles of uniform shape and size. The apparatus is of especial utility for applying a protective coating to roofing elements such as single and multiple shingles, this coating consisting of a water-resistant sealing layer of a material such as asphalt, and surfacing of solid material applied thereover. An embodiment of the invention suitable for treating such shingles will therefore be described in detail for purposes of illustration, although it is to be understood that the utility of the invention is by no means limited to any specific product. By means of this apparatus shingles of a novel type can readily be produced and the invention includes not only these shingles, but also the apparatus.

In the manufacture of certain prepared roofing elements or shingles which consist of a base of a plastic composition molded to appropriate shape and form, it is desirable to complete the element by giving it a coating of wear surfacing, such as crushed slate and the like, and also to apply to certain surfaces of the element a layer or coating of a non-stick material, such as talc, so that these elements may be bundled together without adhering. The process of applying such coatings is ordinarily carried on by hand, and involves dipping the elements in vats of a water-resistant material, such as asphalt, then sprinkling the granular and non-stick material over the asphalt coating before the latter is set and rolling the particles to embed them partially in the asphaltic layer. Owing to the manner in which the granular material is applied, one entire surface of the element, namely, the surface which is to lie uppermost, will be covered with a granular surface material, such as crushed slate, while the bottom surface will be coated with powdered talc or other similar substances which cover the asphaltic layer and prevent the shingle from sticking to others. It will be observed that in the case of shingles coated in this manner, the crushed slate is applied to a considerable area on the upper surface of the shingle which is not exposed to the weather, and which therefore requires no granular surfacing. As this surfacing material adds considerably to the weight of the shingles and to their cost, it is desirable to use as little of it as is required, and to limit it only to such portions of the shingle as will be exposed when the latter is laid in the usual manner, but by the procedure now in practice, it is not practicable to attempt to limit the granular material to any area less than the entire face of the shingle.

A process of applying surfacing to roofing elements which is somewhat similar to that above described is frequently employed in connection with elements made of the usual roofing felt, the purpose of this treatment being to increase the thickness of the elements at the butt. Ordinarily the felt used in so-called prepared roofing products is relatively thin and shingles cut from it are therefore sometimes objected to by the consumer, because they do not give the roof the attractive appearance which results from the use of elements which cast a noticeable shadow. In order to increase the thickness of the butt of such shingles, the butts are dipped in asphalt, so as to cover such portions of the shingles as are normally exposed to the weather, and after a coating of asphalt is applied, a layer of granular material is affixed in the usual way. By successive dippings and applications of the granular substance, the element may be built up to the required butt thickness. These operations of dipping the shingles in the asphalt bath and applying granular material have been heretofore carried on by hand and for that reason they add considerably to the cost of the finished product and production is at a low rate. Furthermore, with such manual procedure it is difficult to secure a product of uniform quality.

The present invention is directed to the provision of apparatus by which the application of a weather-resistant surfacing layer may be carried on rapidly and in a uniform manner, and this apparatus is so arranged and constructed that by its use the relatively heavy granular substance used as a surfacing may be limited to such parts only of the shingle as are normally exposed. In one form the apparatus of the invention includes a drum which is mounted to rotate on an axis and running on the surface of this drum is a belt which also extends around a guide pulley at a distance from the drum. As the drum is rotated by suitable means the articles to be treated are inserted between the drum and the belt, so as to be held by the belt and carried around by the drum, the ends of the articles projecting below the belt. At one point in such movement these projecting ends enter a vat containing a quantity of coating liquid, such as asphalt, and these portions of the shingles thereupon receive a film of the liquid asphalt which acts as a sealing layer and an adhesive. Beyond the asphalt tank the shingles pass by devices for applying granular material and the non-stick substance, and these devices are arranged so that granular material may be applied to one surface of the shingle and the non-stick compound to the other. As only one end of each shingle is exposed, due to its projection from between the belt and drum, the shingles may be placed in position so that the projecting end includes the part of the shingle normally exposed to the weather, the granular material may be limited to the normally exposed area of the shingle, and the talc or non-stick product may be applied to the rear surface.

When the shingles carried by the belt and drum have practically completed their rotation, they are dropped from between the belt and drum as the belt leaves the drum to pass around the guide pulley. The shingles may now be reversed and again inserted between the belt and drum, so that the uncoated portions may be given the same treatment. Preferably the apparatus includes two drums and belts so that one end of each shingle may be treated during its passage around the upper drum, and the other end during its passage around the lower drum. Thus all portions of the shingles are given the desired coating and the solid material used as the surfacing may be limited to such parts of the shingles as may be desired.

The new shingle which is produced by this apparatus may have a surfacing of granular material on both faces at the butt, or on only one face of the shingle at this butt end, with the rest of the shingle coated with the non-stick compound, or various other distributions of granular and non-stick material may be secured, the shingle being acted on in such a way that the front and rear faces of the butt and the front and rear faces of the thin end are separately coated, so that different surfacing materials may be applied to these areas.

For a better understanding of the invention, reference will be had to the accompanying drawings, in which Fig. 1 is a plan view of the apparatus, Fig. 2 is a view of the apparatus in side elevation, Figs. 3, and 4, and 5 are sectional views on the lines 3—3, 4—4, and 5—5, respectively, of Fig. 1, Figs. 6 and 7 are fragmentary views in side elevation and transverse section respectively of modified forms of certain parts of the apparatus, Fig. 8 is a sectional view of the new product which may be produced by this apparatus, and Figs. 9 and 10 are front and rear face views respectively of this product.

Referring now to the drawings, the apparatus is shown as including a drum or carriage generally designated 10 and consisting of upper and lower rings designated 11 and 12 respectively. These rings are supported on arms 13 which are secured to a polygonal frame 14 provided with a circular rack 15 on its inner face. This frame is of any suitable construction of metal or the like and includes spaced inner and outer sub-frames between which the frame carries a plurality of flanged wheels 16 which run on a circular track 17 supported at intervals on standards 18 of graduated heights so that the plane of the track is inclined to the horizontal. The rack 15 is engaged by a pinion 19 on a vertical shaft, this pinion being driven in any convenient manner, as by a worm 20 on the shaft of a motor 21.

The apparatus which is of double form including two rings has two belts 22 and 23 which extend around these rings in contact therewith, thus providing means for the treatment of two sets of articles simultaneously. Each belt passes from its ring around a guide pulley 24, thence around another pulley 25 at a distance from the ring, around a suitable take-up pulley 26 which may be adjusted so as to vary the tension on the belt, and then around a guide pulley 27 at which point the belt comes again into contact with the ring.

The articles to be treated are illustrated as in the form of single shingles generally designated 28, these shingles being of the ordinary rectangular shape and of the usual size. Multiple shingles may likewise be treated in this apparatus as well as various other elements of this general character. Disposed beneath each belt and extending from a point beyond the guide pulley 27 part way around the ring is a trough or vat 29 which contains the coating material. For the treatment of shingles, asphalt is preferred, and the troughs may be heated by suitable means to keep the asphalt in molten condition. The projecting end 31 of the vat is so placed that a workman, in feeding the shingles to the apparatus, inserts one end of each shingle in the vat at the end 31, then moves the shingle parallel to the drum until its upper end is gripped between the belt and the drum. The shingle is now carried around through the trough, thus insuring that it will receive a thorough coating of asphalt. The trough lies in a horizontal plane and due to the inclination of the drum, the shingle is carried upwardly out of the trough at the end 32.

The shingle is next carried with the belt and drum between grooved rolls 33 shown in Fig. 5, at which point the coating material is applied. As illustrated, the shingles, which are of tapered form with thick butts, are first carried around the apparatus by means of the lower drum and its belt, the shingles being placed in position with their thin ends gripped between the belt and drum, as shown in Fig. 3, so that the thick butt of each shingle is coated. After the application of asphalt, the butts of the shingles which project below the drum and belt are next given the coating of solid material, and preferably granular surfacing material is applied to one face of the shingles at the butt, and the non-stick compound to the opposite face. For this purpose the shingles, after passing through the troughs, pass through the rolls 33 at which point is a nozzle 34 leading from a closed receptacle 35 in which grit is placed. An air blast from the tank 36 forces the grit from this receptacle through the nozzle 34 which distributes it against the tacky asphalt layer on one face of the butt of the shingle. The rear face at this point likewise receives a coating of talc or other non-stick compound which is contained in a receptacle 37 connected with the tank 36. An air blast from the tank feeds the talc through a pipe 38 which has an extension 39 leading to a nozzle 40 at one side of the rolls 33, the nozzle 40 discharging a blast of talc against the rear face of the shingle just before the latter passes between the rolls. The rolls are arranged to apply pressure to the opposite faces of the shingle so as to partially embed the grit and talc in the asphalt coating and after passage through the rolls 33, the shingle is carried around by the belt and drum to the roller 24 at which place the belt leaves the drum and the shingle is released and dropped. As the rolls 33 are at a considerable distance from the roller 24 and the drum is rotated at a slow rate, the asphalt which acts as an adhesive binder for the solid material has an opportunity to set and harden before the shingles are released.

At the point 24 the shingles are removed and reversed, and then inserted with their coated ends between the upper drum and belt. At the time of such insertion the uncoated ends of the shingles are inserted by the workman into the asphalt contained in the upper coating tank and carried through this tank by the rotation of the drum. When the shingles leave the tank, they are carried between a pair of grooved rollers 41, 41, just prior to which talc is discharged against the surfaces of the shingles through nozzles 42 receiving talc through the pipe 38 from the receptacle 37. This talc is partially submerged in the asphalt coating by the action of the rolls and the shingles are then carried around as before and discharged adjacent the roller 24. The shingles may then be placed on a roller conveyor 43 which delivers them into the open center of the apparatus where the shingles may be bundled and packed for shipment.

The apparatus is preferably disposed close to a machine in which the articles are produced, as, for example, a shingle-making machine, the location of which is indicated by the reference character 44. From this apparatus the shingles are delivered by a conveyor 45 to the workman who places them in the coating apparatus.

Instead of employing a pair of rolls and an air blast for the application of the solid material to the faces of the shingles, the apparatus shown in Fig. 6 may be employed. Here the shingle 28 passes between sets of rollers 46 placed in pairs in position to engage opposite faces of a shingle. These rolls lie in hoppers 47 on opposite sides of the path of travel of the shingle and the solid material which is to be applied to the shingle is introduced into the top of the hoppers and then forced into contact with the shingle as the latter passes between the rolls. The rolls preferably have pointed tops, as at 48, so that the solid material introduced into the hoppers will be properly distributed and flow down between the rolls in a position to be forced against the shingle surfaces by the action of the rolls.

The novel shingle is illustrated in Figs. 8, 9, and 10, and in the form shown the shingle is of the single size and has a tapering section. Grit, such as crushed slate, and other granular products are applied on the area 49 which is the upper face of the shingle at the butt. This grit-covered area includes that part of the shingle which is normally exposed to the weather. To the rear of this area on the upper face of the shingle is a space 50 which, being covered when the shingle is laid in the normal way, does not require the application of a surfacing material such as crushed slate. This area should be covered by a non-stick compound and by means of the apparatus illustrated, talc can be applied to this surface. The rear face of the shingle 51 may also be covered with a coating of talc or other non-stick material, so that the shingles can be bundled together. In some instances it may be desirable to coat both faces of the shingle at the butt with the grit material, as for example, reversible shingles can be made with the normally exposed portion of one face covered with a grit of one type, such as a green slate, and the other face covered with a grit of another type or color, such as red slate. The application of grit in this manner is a simple operation by the apparatus illustrated and the shingle thus treated has the capability of being laid with either face uppermost, and when these faces are coated with grits of different colors, a mottled effect may be produced on the roof which is very attractive. By reason of the fact that in the new apparatus the faces of the shingles are treated in two operations, with each half face treated separately, it is apparent that many different combinations of surfacing material may be applied, but for ordinary use shingles such as that illustrated in Figs. 8, 9, and 10, are most satisfactory. Here the grit which adds to the weight of the shingle and also is an important item in the cost is limited only to that part of the shingle surface which is visible when the shingles are laid in courses, the remainder of the shingles being covered by any suitable non-stick compound.

I claim:

1. Apparatus for coating purposes, which comprises the combination of a rotary drum, an endless belt extending around the drum, this belt having a portion held free of the drum whereby articles to be coated may be inserted and held between the belt and the drum, and means for holding a supply of coating material out of contact with the drum, said means being disposed adjacent the periphery of the drum and in position to be entered by the articles held between the belt and the drum as the drum rotates.

2. Apparatus for coating purposes, which comprises the combination of a rotary drum, an endless belt extending around the drum, this belt having a portion held free of the drum whereby articles to be coated may be inserted and held between the belt and the drum, means for holding a supply of liquid coating material out of contact with the drum, said means being disposed adjacent the periphery of the drum and in position to be entered by the articles carried around between the belt and the drum as the drum rotates, and means disposed beyond the supply of coating material in the direction of movement of the drum for applying a layer of finely divided solid material to the articles over the surfaces coated with the liquid.

3. Apparatus for coating purposes, which comprises the combination of a rotary drum, an endless belt extending around the drum and around a guide member spaced therefrom, whereby articles to be coated may be inserted between the belt and the drum and carried around the drum, and means for holding a supply of coating material out of contact with the drum, said means being disposed adjacent the periphery of the drum in position to be entered by the articles moving around the drum.

4. Apparatus for coating purposes, which comprises the combination of a rotary drum mounted with its axis inclined to the vertical, means for rotating the drum, a belt extending around the drum and around a guide member spaced at a distance therefrom whereby articles to be coated may be gripped between the belt and the drum with portions of these articles projecting beyond the plane of the drum, and means for holding a supply of coating material out of contact with the drum, said means being disposed adjacent the point where the periphery of the drum is lowest and in position to be entered by the projecting portions of the articles carried around with the drum.

5. Apparatus for coating purposes which comprises the combination of a track arranged with its plane inclined to the horizontal, a carriage movable on the said track, a belt encircling the carriage and also passing around a guide member disposed at a distance from the periphery thereof whereby articles to be coated may be gripped between the belt and the carriage and carried thereby around the carriage, and means for holding a supply of coating material out of contact with the carriage, said means being disposed adjacent the carriage at the point where the periphery of the latter is lowest, this coating material being entered by the articles as they are carried around the carriage in its movement.

6. Apparatus for coating purposes which comprises the combination of a circular track, the plane of which is inclined to the horizontal, a drum having rollers running on the track, the axis of this drum being thereby inclined to the vertical, a belt encircling the drum and also passing around a guide member disposed at a distance therefrom whereby articles to be coated may be gripped between the belt and the drum with portions thereof projecting beyond the edge of the drum, means for moving the drum around the track, and a container for holding coating material out of contact with the drum, this container being disposed adjacent the drum near the point where the periphery of the latter is lowest and arranged to be entered by the articles gripped between the belt and the drum in their movement around the drum.

7. Apparatus for coating purposes which comprises the combination of a circular track arranged with its axis inclined to the vertical, a drum having rollers running on the track, a belt encircling the drum and also passing around a guide member disposed at a distance therefrom whereby articles to be coated may be inserted between the belt and the drum and carried around the drum thereby, means for rotating the drum, and a tank for holding coating material out of contact with the drum, this tank being disposed adjacent the periphery of the drum near the point where the latter is lowest, and curved to conform to the peripheral shape of the said drum, this tank being arranged to be entered by the articles gripped between the belt and the drum during the movement of the articles around the drum.

8. Apparatus for coating purposes which comprises the combination of a track, a frame provided with rollers running on the track, means for moving the frame along the track, a drum mounted on the frame, a belt extending around the frame and bearing on the said drum, this belt also extending around a guide member disposed at a distance from the frame, the drum and belt providing means whereby articles can be gripped between the belt and the drum and carried around with the drum, and a container for holding coating material out of contact with the drum disposed adajcent the said drum and arranged to be entered by the articles carried between the belt and the drum as the frame rotates.

9. Apparatus for applying coatings to articles, which comprises a drum arranged for rotation about an axis, a belt extending around the drum and also around a guide member at a distance therefrom, the belt and drum providing means whereby the articles may be placed between the belt and the drum and carried thereby as the drum rotates, the portions of these articles which are to be treated extending beyond the plane of the drum, a container for liquid coating material disposed adjacent the drum and in position to be entered only by the projecting portions of the articles as the drum rotates, and means disposed adjacent the periphery of the drum beyond the said container for applying a finely divided solid material to the coated portions of the articles carried by the belt and drum and for rolling the said material into the surfaces thereof.

10. Apparatus for applying coatings to articles, which comprises the combination of a rotary drum, a belt encircling the drum and a guide member disposed adjacent thereto, the belt and drum providing means whereby the articles to be treated may be gripped between the belt and the drum and carried around the drum as the latter rotates, these articles being placed in position with the portions to be treated extending below the edge of the drum, a vessel containing coating liquid arranged adjacent the periphery of the drum and in position to be entered only by the projecting portions of the articles gripped between the belt and the drum, and means beyond the vessel for applying a finely divided solid material to the coated surface of the articles carried by the drum and belt and for pressing this material into intimate contact therewith.

11. Apparatus for applying finishing coatings to roofing elements and the like which comprises the combination of a rotary drum arranged with its axis inclined to the vertical, a belt encircling the drum and a guide member disposed adjacent thereto whereby the elements to be treated may be gripped between the belt and the drum and carried around the drum as the latter rotates, these elements being placed in position with the portions to be treated extending below the edge of the drum, a vessel containing coating liquid arranged adjacent the periphery of the drum near the point where the said periphery is lowest and in position to be entered only by the projecting portions of the elements gripped between the belt and the drum, means for applying finely divided solid material to the coated portions of the elements gripped between the belt and drum, and rolls arranged to press the said material against the surface of the elements.

12. Apparatus for applying finishing coatings to roofing elements and the like, which comprises the combination of a rotary drum arranged with its axis inclined to the vertical, a belt encircling the drum and a guide member disposed adjacent thereto, the belt and drum providing means whereby the elements to be treated may be gripped between the belt and the drum and carried around the drum as the latter rotates, these elements being placed in position with the portions to be treated extending below the edge of the drum, a vessel containing coating liquid arranged adjacent the periphery of the drum near the point where the said periphery is lowest and in position to be entered only by the projecting portions of the elements gripped between the belt and the drum, a pair of rolls arranged one on either side of the periphery of the drum in such position that the elements carried by the drum pass between them, and means for applying finely divided solid material to the surfaces of the elements prior to their passage through the rolls including nozzles and pneumatic means for supplying the said material to the nozzles.

13. Apparatus for applying finishing coatings to roofing elements and the like which comprises the combination of a circular drum arranged for rotation on an axis inclined to the vertical, a belt encircling the drum and a guide member disposed at a distance from the periphery thereof whereby the elements to be treated may be inserted between the belt and the drum to be carried around by the drum as the latter rotates, a vessel for liquid coating material disposed adjacent the periphery of the drum in position to be entered only by the elements gripped between the belt and the drum, and means for applying finely divided solid material to the surfaces of the elements which have been coated by passage through the vessel, the said means including rollers bearing against opposite faces of the elements while so gripped, and pneumatic means for applying the said material to opposite faces of the elements to be pressed into the surfaces thereof by the rollers.

14. In apparatus for applying coating material to roofing elements and the like, the combination of a pair of drums arranged to rotate on an axis, a belt extending around each drum and around a guide member disposed at a distance therefrom whereby articles to be treated may be gripped between each belt and its drum and carried thereby, these articles being placed in position with the portions to be treated extending beyond the plane of the drum, rolls arranged in the path of movement of the articles so gripped and adapted to bear against opposite faces of the extending portions thereof, and means for supplying finely divided solid material to the rolls for application thereby to the elements passing between the latter.

15. In coating apparatus, the combination of means for supporting and moving the articles to be coated along a substantially closed path with the articles held normal to the plane of movement, said path lying wholly in said plane and said plane being wholly inclined to the horizontal and the articles being held with portions projecting below said plane, and a vessel for coating material disposed in the path of said articles to be entered by their projecting portions.

16. In coating apparatus, the combination of a conveying device for supporting and moving the articles to be coated along a substantially closed path lying wholly in a plane inclined to the horizontal with the articles extending normal to said plane and having portions free of said device and lying below said plane, a vessel for coating material disposed in the path of said articles to be entered by their projecting portions, and means for applying another material to said articles, said means lying beyond said vessel in the direction of movement of said articles and applying said other material to the coated articles.

In testimony whereof I affix my signature.

THOMAS ROBINSON.